United States Patent [19]

Meijs et al.

[11] 4,061,191

[45] Dec. 6, 1977

[54] METHOD FOR GASEOUS SAND CONSOLIDATION TREATMENT OF WEAK GAS SANDS

[75] Inventors: Franciscus H. Meijs; David R. Davies, both of Rijswijk, Netherlands

[73] Assignee: Shell Oil Company, Houston, Tex.

[21] Appl. No.: 697,491

[22] Filed: June 18, 1976

[30] Foreign Application Priority Data

Mar. 12, 1976 United Kingdom ............... 9995/76

[51] Int. Cl.² .................... E21B 43/00; E21B 43/02
[52] U.S. Cl. .................................. 166/292; 166/250; 166/300
[58] Field of Search ............. 166/292, 276, 281, 300, 166/250, 307

[56] References Cited

U.S. PATENT DOCUMENTS

| | | | |
|---|---|---|---|
| 2,019,908 | 11/1935 | Kennedy et al. | 166/292 |
| 2,469,354 | 5/1949 | Bond | 166/292 X |
| 2,633,919 | 4/1953 | Bauer et al. | 166/300 |
| 2,808,886 | 10/1957 | Bail et al. | 166/292 X |
| 3,070,161 | 12/1962 | Kerver et al. | 166/292 X |
| 3,087,542 | 4/1963 | Becker | 166/292 |
| 3,221,505 | 12/1965 | Goodwin et al. | 166/292 X |
| 3,252,513 | 5/1966 | Holmes | 166/292 X |

*Primary Examiner*—Stephen J. Novosad
*Assistant Examiner*—George A. Suchfield

[57] ABSTRACT

In a relatively weak water-wet gas-producing reservoir in which a liquid tends to impair the gas production, the rock strength is increased by injecting a silicon polyhalide vapor, such as silicon tetrachloride vapor, mixed with a relatively inert gas, so that the silicon halide converts the rock-wetting water to a rock-strengthening silica gel.

10 Claims, 3 Drawing Figures

METHOD FOR GASEOUS SAND CONSOLIDATION TREATMENT OF WEAK GAS SANDS

BACKGROUND OF THE INVENTION

The invention relates to a method of treating parts of an underground permeable formation surrounding a well penetrating the formation which is producing sand or is likely to produce said during the lifetime of the well. More particularly, the invention relates to a method of treating formation parts having the pore spaces thereof substantially filled with gas and having water adhering to the walls of the pore spaces. In its more specific aspects the invention is concerned with the consolidation of a gas-containing formation without impairing the permeability thereof to an extent that would reduce the valve of the well penetrating said formation as a production well.

There exist numerous undergound formations from which gases, such as hydrocarbon gases are being recovered via wells penetrating such formations. In case the formation parts surrounding a well consist of formation grains that are insufficiently bonded together, large amounts of such grains will be detached from the formation by the gas flowing from the pore spaces into the well and hamper the recovery of gas through the well. Several types of treatments that are aimed at consolidating or improving the consolidation of the formation parts surrounding production wells have been suggested and tried out in the past. However, it became clear that although these methods often proved successful in improving the consolidation of incompetent formation areas having the pore space thereof filled with liquid such as crude oil, these methods when applied to gas-filled formations are apt to impair the permeability of the formation pore spaces by liquid blocking.

The application of halides of silicon for plugging purposes in the pore space around wells has been known for a long time. Silicon chloride dissolved in oil and silicon fluoride in vapor phase have been injected into water-filled layers that have to be shut off.

Also, the use of halides of silicon dissolved in nonaqueous liquids is known for consolidating water-wet oil-containing formation parts. Application, however, of his known technique in a water-wet gas-containing formation would however, seriously impair the permeability thereof since the nonaqueous liquid left in the pore space cannot fully be removed therefrom after the treatment. In general, it can be said that application of liquids in a gas well for treatment purposes is not considered attractive since it will often lead to productivity impairment of the well due to the inability of the well to clean itself, when placed on production, of the liquids which have invaded the formation during the treatment. This so-called liquid-blocking of the pore space is a serious disadvantage of the known treatments designed for consolidating the formation around gas wells.

Descriptions of such prior plugging and consolidating uses of halides of silicon are contained in patents such as the following:

| U.S. Patent Specification | Reagent | Carrier | Water Present | Formation | Object |
|---|---|---|---|---|---|
| 3,087,542 | $SiF_4$ | Gas | In thief stone | Gas | Plugging of thief zones |
| 3,252,513 | $SiCl_4$ | Oil | Pre-injected | Calcareous | Plugging |
| 3,055,426 | Silicon halide | Oil | Yes | Oil/Gas | Consolidation |
| 2,808,886 | $SiCl_4$ | Wet Gas | | Oil | Plugging |
| 3,055,425 | Silicon halide | Liquid | Yes | Oil/Gas | Consolidation + stabilization |
| 3,090,435 | " | Liquid | Yes | | Consolidation |
| 3,070,161 | " | Oil | Connate | Oil | Consolidation + Stabilization |
| 2,019,908 | " | Oil | do | Oil | Plugging or Consolidation |

Object of the invention is a treatment method for improving the strength of an incompetent gas-containing formation without impairing the permeability thereof to an extent that would render the wells through which such treatment has been carried out incapable for the recovery of gas therefrom at economic production rates.

A further object of the invention is a cheap treatment for consolidating a gas-containing formation in the zone thereof that surrounds a well penetrating said formation, which treatment is moreover simple and can be carried out with a minimum of equipment.

SUMMARY OF THE INVENTION

The invention relates to a process for increasing the rock strength of a water-wet gas-producing reservoir which is or is likely to become unconsolidated, without causing a liquid blocking within the reservoir. The water content of the reservoir is adjusted to the extent necessary to provide a significant but small proportion of water on the rock surfaces. The vapor of a silicon polyhalide having a water reactivity substantially equivalent to that of silicon tetrachloride is mixed with a substantially inert gas. The mixture is injected into the reservoir so that significant proportions of the rock-wetting water in the region adjacent to the well are converted to a rock strengthening silica gel.

DESCRIPTION OF THE INVENTION

Figure 1:
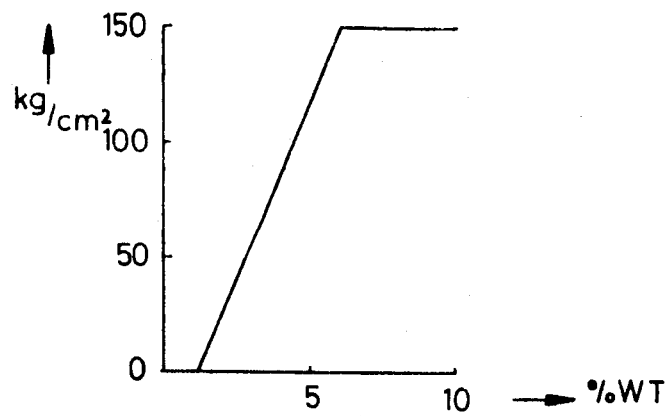
FIG. 1 shows a plot of compressive strength on consolidation of the cores in $kg/cm^2$ (along the Y-axis) against original water content in %wt of the sand (along the X-axis).

The present invention is, at least in part, based on the following discovery. In a water-wet gas-producing reservoir that contains a significant but small proportion of water, the rate and the nature of the reaction between the rock-wetting water and a silicon polyhalide vapor (in a mixture of that vapor and an inert gas) are such that the rock-wetting water is converted to a silica gel that significantly increases the rock strength of the reservoir without unduly reducing its effective permeability. Where silicon tetrachloride is used as the silicon polyhalide, (a) the water content of the reservoir is preferably adjusted to be from about 3-7% by weight, and (b) the proportion of silicon tetrachloride which is mixed with the inert gas is preferably one obtainable by bubbling the inert gas through liquid silicon tetrachloride at a temperature of not more than about the reservoir temperature.

Silicon tetrachloride, silicon hexachloride and silicon octochloride are examples of silicon chlorides that may be applied in the method of the present invention.

The preparation of the gaseous mixture may either take place at the surface of the earth at or near the top entrance of the well, or in the well at a level near the parts to be consolidated. In the latter case, the carrier gas and the silicon halide(s) are supplied to the said level through separate passage ways in the well.

LABORATORY EXPERIMENTS

Consolidation experiments have been carried out on sand grains packed in a glass core holder. The sand had previously been mixed with a known amount of water. The water adhering to the walls of the pore spaces between the sand grains was thereafter brought into contact with a mixture of the consolidating agent silicon tetrachloride in vapor form and a carrier gas (such as nitrogen, air or methane). The mixture was formed by bubbling the carrier gas through a bubbler containing liquid silicon tetrachloride.

After the amorphous silica (silica gel) had been formed on the walls of the pore spaces (which walls include the contact points between adjacent sand grains) by the reaction of the silicon tetrachloride with the water, the consolidated core was removed from the glass holder and its compressive strength, permeability and water stability ascertained, as will be explained in more detail with reference to Tables 1 and 2.

It is observed that the experiments showed the reaction between silicon halide and water to be essentially instantaneous. The treatment time of the present method thus depends on the rate at which the consolidating agent is injected and the amount of consolidating agent to be injected. This rate is a function of the speed at which the carrier gas is pumped into the well, and of the silicon halide concentration. The composition, pressure and temperature, of the carrier gas control the maximum concentration of the consolidating agent which can be carried in the vapor phase. Consolidation can be carried out by gaseous mixtures with consolidation agent concentrations ranging from essentially saturated to the lowest concentration dictated by economic constraints.

It will be appreciated that the application of the present method obviates the necessity for leaving the well closed in after the consolidation operation has been completed as is the case in known consolidation reactions wherein resinous components are used for consolidation purposes with retention of permeability.

Since the silicon tetrachloride reacts with the water adhering to the walls of the pore spaces according to the equation: $SiCl_4$ (gas) + $2H_2O$ (liquid)$\rightarrow SiO_2$ (amorphous) + $4HCl$ )gas) it should be borne in mind that under special circumstances it might be required to neutralize the hydrochloric acid produced. Gaseous ammonia may be used for that purpose. The effect of ammonia on the consolidation was tested by overflushing with ammonia gas followed by a volume of dry gas. There was no change in the unconfined compressive strength.

1. Strength of Consolidation

The results of unconfined compressive strength measurements on various cores are reported in Table 1.

Tap water was used in all experiments for wetting the sand grains.

The sand used was Oude Pekala Sand. This is a surface sand with $d_{10} = 180\mu$
$d_{75} = 130\mu$
$d_{95} = 83\mu$ and $2\frac{1}{2}\% < 50\mu$ (N.B. $d_N = X\mu$ means that n% of the sand grains is larger than X microns).

Air was used in all experiments as carrier gas.

TABLE 1

| Unconfined Compressive Strength Measurements | | |
|---|---|---|
| Experiment No. | Water % Wt. | Unconfined Compressive Strength kg/cm² |
| 1 | 1.25 | 9 |
| 2 | 2.5 | 48 |
| 3 | 3.75 | 84 |
| 4 | 5.0 | 136 |
| 5 | 7.0 | 157 |
| 6 | 9.1 | 154 |

The compressive strength measurements have been carried out on the core removed from the glass core holder. During these measurements the cores were unconfined (that is not supported at the side walls thereof).

In subsidiary experiments it was shown that the strength did not increase with time when the core was at room temperature. The use of saturated salt solutions instead of tap water for saturating the core lead to a somewhat reduced strength.

2. Permeability of Consolidated Core

Permeability measurements have been made with the core mounted in the glass core holder. Extra measurements have also been made on small cores cut from the large core referred to above.

The "Ruska" gas permeameter was used for these small cores. These results are recorded in Table 2:

TABLE 2

| | | | Permeability Measurements | | | | |
|---|---|---|---|---|---|---|---|
| | | | | Permeability of whole core (Darcy) | | "Ruska" permeability of a small section of consolidated core (Darcy) | |
| Experiment No. | Water % Wt. | Porosity % | Unconsolidated | Consolidated Dry | Wet | Dry | Wet |
| 1 | 1.25 | 36.8 | 7.1 | 7.6 | 3.9 | 7.1 | 3.9 |

TABLE 2-continued

| | | | Permeability Measurements | | | | |
| --- | --- | --- | --- | --- | --- | --- | --- |
| | | | Permeability of whole core (Darcy) | | | "Ruska" permeability of a small section of consolidated core (Darcy) | |
| Experiment No. | Water % Wt. | Porosity % | Unconsolidated | Consolidated Dry | Wet | Dry | Wet |
| 2 | 2.5 | 37.4 | 7.3 | 7.3 | 2.3 | 5.8 | 3.0 |
| 3 | 3.75 | 39.1 | 7.8 | 7.3 | — | 5.2 | 2.7 |
| 4 | 5.0 | 39.0 | 4.7 | 5.2 | 1.1 | 4.5 | 1.7 |
| 5 | 7.0 | 37.3 | 3.9 | 3.3 | — | 2.7 | 1.1 |
| 6 | 9.1 | 38.1 | 1.9 | 1.1 | — | 2.1 | 0.7 |

Table 2 shows that the permeability immediately after consolidation ($k_{dry}$) is of the same order of magnitude as the permeability of the wet pack before the treatment. This indicates that the volume of amorphous silica formed as a result of the treatment is about equal to the volume of water present before consolidation. When flooding the consolidated core with water and gas a new water saturation is established, as a result of which the gas permeability is further reduced ($k_{wet}$ after consolidation).

3. Waterstability

Experiments showed the consolidated core to be stable when in contact with stagnant water. Therefore, stabilization of the consolidation will not form a problem in those gasfields where the recovered gas is dry. In such fields, the consolidation will not be in contact with flowing water and the consolidated parts of the treated formation will therefore maintain their original compressive strength resulting from the consolidation treatment.

Small amounts of water in contact with the consolidation will furthermore cause no decrease in strength thereof as lone as the water is stagnant.

Flowing water was found to attack the consolidation and render the formation unconsolidated. This was shown by an experiment in which a consolidated core (of 8 centimeters length and 2.5 centimeters diameter) was placed in a rubber sleeve and flushed with tapwater at ambient temperature and at a rate 3 litres/hour. The core became unconsolidated after 7 days.

Therefore, special measures for stabilizing the consolidating material should be taken when it is in contact with flowing water. Such measures incorporate steps to render the consolidating material essentially hydrophobic or preferentially oil-wet. Oil-wetting agents such as aryl or alkyl silicon halides, e.g., dimethyl dichloro silane, may be supplied to the formation parts to be treated by injecting a slug of such agent in liquid or gas phase after the consolidation process, or in vapor phase by incorporating the agent in the gaseous mixture consisting of a carrier gas and the silicon chloride or fluoride that is being injected for consolidating purposes. It will be appreciated that the latter technique will give better results than the first technique since the hydrophobic property is not applied subsequently, and thus superfically, as in the first technique, but is incorporated. throughout the total volume of the consolidating material. Thus, the stability against the attack of flowing water will in the latter case not be influenced by surface attack that might occur in the consolidating material.

Figure 2:
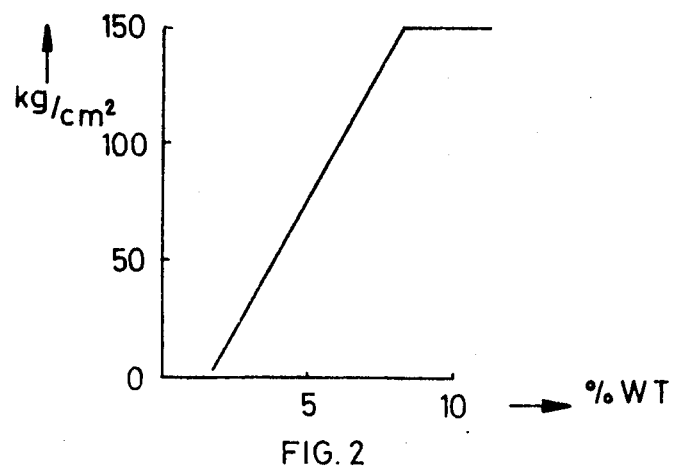
FIG. 2 shows a plot of compressive strength on consolidation of the core in $kg/cm^2$ (along the Y-axis) against the weight of cementing material in %wt of the sand (along the X-axis).
Figure 3:
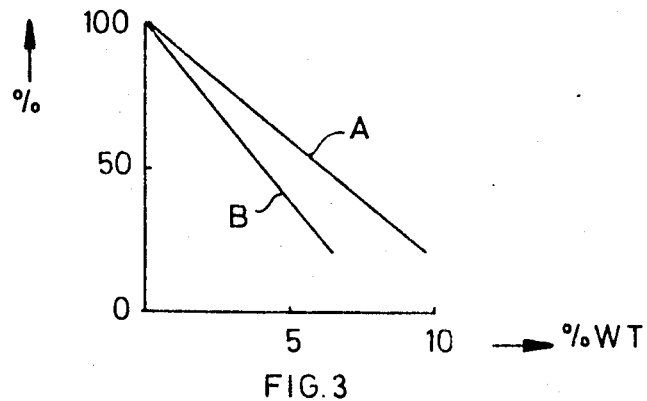
FIG. 3 shows a plot of permeability retention (in %) on consolidation of the cores (along the Y-axis) against the original water content of the sand in %wt (along the X-axis).

Finally, reference is made to FIGS. 1-3 in the drawing showing the behaviour of cores having a variable water content, when consolidated by the method of the present invention. In the drawing:

FIG. 1 (which corresponds to the data of Table 1) shows a plot of compressive strength on consolidation of the cores in kg/cm$^2$ (along the Y-axis) against original water content in %wt of the sand (along the X-axis);

FIG. 2 shows a plot of compressive strength on consolidation of the cores in kg/cm$^2$ (along the Y-axis) against the weight of cementing material in %wt of the sand (along the X-axis); and FIG. 3 (which corresponds to the data of Table 2) shows a plot of permeability retention (in %) on consolidation of the cores (along the Y-axis) against the original water content of the sand in %wt (along the X-axis). Curve A indicates the "dry" permeability (obtained directly after the consolidation) whereas curve B refers to the "wet" permeability (obtained after water flooding the consolidated core followed by flushing the core with gas).

FIELD APPLICATION

The following scheme is an example of a field application of the method of the present invention.

1. Natural gas available at the recovery site is passed through an additional drying stage and compressed to a sufficiently high pressure for re-injection into the formation via a well producing or expected to produce sand.
2. The dry gas (which contains at most 0.05 w% water) is injected into the well to be treated at least for a period of time sufficient to remove all water from the inside of the tubulars in the well. Dry gas injection should preferably be continued for a sufficient period of time to reduce the water saturation of the sand around the well-bore to a desired value as ascertained by previous laboratory experiments.
3. Injection of liquid SiCl$_4$ into the dry gas is started at such a rate that an undersaturated SiCl$_4$-vapor is produced under downhole conditions (the gas will already be warm owing to the heat of compression). Injection of SiCl$_4$ is continued until all water, up to a specified depth, has reacted, forming cementing material. The amount of consolidating agent required may be simple calculated from the length of formation interval to be treated, the depth of treatment (normally 0.6-1.0 meter), the porosity and water saturation of the formation and the stochiometry of the consolidating reaction.
4. After stopping SiCl$_4$ injection, injection of dry gas is continued to displaced all SiCl$_4$ vapor from surface and subsurface facilities. Sufficient extra gas may be injected to displace acidic gases deep enough into the formation, so that it can be assumed that sufficient basic rock material is contacted to react with more of the hydrochloric acid produced during the consolidation reaction.

5. After the consolidation of step (4), treatments with other chemicals — such as those needed to neutralize produced hydrochloric acid or to "waterproof" the consolidation — can be carried out in the same manner as the procedure of step (3).

6. The production facilities are reconnected and production resumed.

In an alternative scheme, the silicon tetrachloride (or any other silicon chloride, either alone or in combination with silicon fluoride, or silicon fluoride alone) may be passed in liquid phase to the level of the formation parts to be treated. The liquid silicon halide is then transported through a tubular (such as a macaroni string or coiled tubing) different from the one through which the carrier gas is passed downwards to the level of the formation to be treated. At the required level in the well, the liquid silicon halide is suppled (e.g., by atomizing via a spray nozzle) to the carrier gas prior to entering the pore spaces of the formation parts to be treated. The liquid silicon halide is vaporized in the carrier gas and enters the pore spaces in vapor phase.

It may be found that the produced natural gas cannot be dried sufficiently at the recovery site in order to prevent plugging of the lines or perforations during the consolidation treatment. It may also be discovered that other components of the natural gas are incompatible with the silicon halide(s) used. In either case another gas will be selected, such as air or liquefied natural gas originating from a different recovery site or liquefied nitrogen. Both of these latter two gases are rigorously dried during their preparation and therefore attractive as carrier gas. Nitrogen is chemically inert, and hence always compatible.

In general, the relatively inert gas with which the silicon polyhalide is mixed should contain only a small proportion, such as about 1% by weight or less of water and preferably contains not more than about 0.05%.

It will be appreciated that in case the formation parts to be treated contain an amount of water adhering to the walls of the pore spaces, which amount of water is not considered sufficient for obtaining the desired compressive strength after consolidation, this deficiency of water may be made up by injecting a volume of wet gas, that is gas containing a certain amount of water in the form of extremely small droplets. Also, the required additional water may be supplied to the formation parts to be treated by injecting a slug of water into the pore spaces of the parts to be treated, followed by a volume of gas to distribute this water over the walls of the pore spaces, thereby ensuring a permeability of these formation parts, which is of a value sufficiently high to allow an economic production of hydrocarbon gas after the hydrolysis of the silicon halide(s) to a silica gel by the water present on the walls of the pore spaces.

If the formation contains an exceptionally high water content which would lead to an unnecessary large permeability reduction on consolidation, then this water content may be reduced by injecting sufficient dry gas into the formation parts.

In case the pore spaces of the formation parts to be treated comprise an undesired amount of gas condensate, this condensate may be removed by injecting dry gas into said formation parts. If necessary, the required amount of water in the formation pore spaces can be obtained by the supply of water thereto in one of the two manners described hereinbefore.

Finally, it will be appreciated that the method of the present invention can be successfully applied to formations having the pore spaces thereof at least partly filled with oil. Thereto, this oil is displaced from the pore spaces of the formation parts to be treated by means of a gas injected into these parts. This gas may be preceded by a slug of liquid that is suitable for displacing the oil even from those places of the pore spaces where large capillary forces exist. Such liquid may be an alcohol (such as methanol), and is preferably a liquid with low vapor pressure. After the oil has been displaced, the required amount of water is introduced into the formation parts (in one of two manners described hereinabove) to wet the walls of the pore spaces of the formation parts to a sufficient extent to reach consolidation by applying the method of the present invention.

What is claimed is:

1. A process for increasing the rock strength of a water-wet gas-producing reservoir which is susceptible to impairment by liquid blocking and is or is likely to become unconsolidated, comprising:
   adjusting the water content of the reservoir to the extent necessary to provide a significant but small proportion of water on the rock surfaces;
   mixing a vapor of a silicon polyhalide having a water reactivity substantially equivalent to that of silicon tetrachloride with a substantially inert gas; and
   injecting the mixture into the reservoir to convert a significant proportion of the rock-wetting water to a rock strengthening silica gel in the region around the well without unduly reducing the effective permeability of the reservoir.

2. The process of claim 1 in which the reservoir water content is adjusted to from about 3-7% by weight.

3. The process of claim 1 in which the amount of silicon halide-containing mixture which is injected is sufficient to cause a reaction with substantially all of the rock-wetting water within a treatment zone in the region around the well in which the depth of treatment is from about 0.6 to 1 meter.

4. The process of claim 1 in which the injection of the silicon halide-containing mixture is followed by an injection of silicon halide-free gas to displace the reaction products of the silicon halide-containing mixture away from the immediate vicinity of the well.

5. The process of claim 1 in which the injection of the silicon halide-containing mixture is followed by an injection of ammonia to neutralize the reaction products of the silicon halide-containing mixture.

6. The process of claim 1 in which the coversion of rock-wetting water to rock-strengthening silicon gel is accompanied by or followed by an injection of an oil-wetting agent for preferentially oil-wetting the surfaces of the silica gel.

7. The process of claim 1 in which the relatively inert gas is a member of the group consisting of nitrogen, air, and gaseous hydrocarbon and has a water content of not more than about 0.05% by weight.

8. The process of claim 1 in which a slug of aqueous liquid is injected and is followed by a slug of silicon halide-free gas to distribute the aqueous liquid, in order to increase the water content of the reservoir.

9. The process of claim 1 in wich a silicon halide-free gas is injected to reduce the water content of a relatively wet reservoir by displacing the liquid in the reservoir away from the vicinity of the well.

10. The process of claim 1 in which a volatile oil solvent liquid is injected to reduce the oil content of an oil-containing gas-producing reservoir prior to the injection of the silicon halide-containing mixture.

* * * * *